United States Patent
Ford et al.

(10) Patent No.: US 6,682,210 B1
(45) Date of Patent: Jan. 27, 2004

(54) TIP-UP LIGHT BAR ASSEMBLY

(75) Inventors: Robert B. Ford, Cromwell, CT (US); Jeffrey A. Nelson, Deep River, CT (US); Peter J. Tiezzi, Chester, CT (US)

(73) Assignee: Whelen Engineering Company, Inc., Chester, CT (US)

( * ) Notice: Subject to any disclaimer, the term of this patent is extended or adjusted under 35 U.S.C. 154(b) by 14 days.

(21) Appl. No.: 10/045,892

(22) Filed: Jan. 11, 2002

(51) Int. Cl.⁷ .............................. B60Q 1/26; F21V 21/26
(52) U.S. Cl. ..................... 362/493; 362/238; 362/250; 362/523; 362/543
(58) Field of Search ................... 362/479, 485, 362/493, 526, 527, 543, 544, 238, 239, 240, 250, 545, 523, 529–532

(56) References Cited

U.S. PATENT DOCUMENTS

| | | | |
|---|---|---|---|
| 1,136,804 A | * | 4/1915 | Horning et al. ............. 362/544 |
| 3,278,741 A | * | 10/1966 | Wood ......................... 362/493 |
| 3,375,365 A | * | 3/1968 | Gross ......................... 362/493 |
| 3,761,890 A | * | 9/1973 | Fritts et al. ................. 362/493 |
| 4,180,010 A | * | 12/1979 | McDermott et al. ........ 362/526 |
| 4,620,268 A | * | 10/1986 | Ferenc ....................... 362/544 |
| 5,084,805 A | * | 1/1992 | Goto .......................... 362/544 |
| 5,379,197 A | * | 1/1995 | Conyers et al. ............. 362/473 |
| 5,595,441 A | * | 1/1997 | McGee ....................... 362/240 |
| 5,651,636 A | * | 7/1997 | Yeh ............................ 362/240 |
| 6,337,623 B1 | * | 1/2002 | Krugh et al. ............... 362/493 |
| 6,464,380 B1 | * | 10/2002 | Young, Jr. .................. 362/523 |

* cited by examiner

*Primary Examiner*—Alan Cariaso
(74) *Attorney, Agent, or Firm*—Alix, Yale & Ristas, LLP

(57) ABSTRACT

A tip up light bar assembly includes front and rear light bars pivotally supported above transversely opposed end assemblies joined by connector bars to form a rigid support structure. Each light bar is built on a rigid substrate having a uniform cross section. Longitudinally extending features of the rigid substrate provide locations for mounting light sources, electronic assemblies and lenses which, together with gaskets, define a weather-resistant enclosure surrounding the light sources and electronic assemblies. The light bars pivot at transversely opposed ends to a vertical position in which the light sources are elevated above traffic. Each end assembly includes a base plate, a pivotally mounted pivot plate. A gas spring reduces the dead weight of the light bar while a limit strap controls angular movement of the light bar relative to the base plate to approximately 90°. A motor-drive actuator exerts outward force on the pivot plates to move the light bars between a horizontal and vertical position.

15 Claims, 7 Drawing Sheets

TIP-UP LIGHT BAR ASSEMBLY

BACKGROUND OF THE INVENTION

1. Field of the Invention

The present invention relates to vehicular warning light systems intended primarily for installation on service vehicles operating on public roads. More particularly, the invention is directed to a vehicular light bar which can be raised from a horizontal to a vertical position to elevate warning lights on the light bar above traffic to give long-range notification of an obstruction or accident in the roadway.

2. Description of the Related Art

Warning light assemblies in the form of light bars mounted on emergency vehicles are well known in the art. The modern trend is toward compact, low profile, self-contained light bar assemblies. Compact self-contained light bar assemblies simplify installation and maintenance while improving the aerodynamic efficiency of vehicles so equipped. Self-contained light bar assemblies include power supplies and control circuitry necessary for actuation and coordination of the various warning lights included in the assembly. Typically, a light bar extends across the width of the vehicle to provide a laterally extended light array including various flashers, spotlights and/or stroboscopic light sources to draw the attention of other vehicles on the roadway. Such light bar assemblies tend to include light sources directed to the front and rear of the vehicle and may include light sources directed to the sides of the vehicle or rotating light sources. Warning light bars are typically rigidly fixed to the roof or highest point of the vehicle for increased visibility.

It is also known in the art to provide auxiliary vehicle warning lights on arms movable between a horizontal and vertical position. Lollypop-type warning lights facing the front and rear of the vehicle are arranged along the arms such that when the arms are raised to a vertical position, the warning lights are elevated above traffic to provide advance warning to those approaching the scene of an accident or obstruction. These known auxiliary warning light systems cannot function as a replacement for a typical light bar assembly because they are typically of a configuration dedicated to an elevated warning function. Thus, known vehicular hazard light systems movable between horizontal and elevated position must be provided in addition to the rigidly mounted horizontal light bar typically associated with police and fire emergency vehicles.

There is a need in the art for a light bar system that will fulfill both the conventional warning light bar function as well as provide an alternative elevated advance warning function.

SUMMARY OF THE INVENTION

An object of the present invention is to provide a new and improved tip up light bar assembly which may replace a fixed horizontal light bar on service vehicles and provide a second, elevated warning light position.

Another object of the present invention is to provide a new and improved tip up light bar assembly of efficient manufacture.

A further object of the present invention is to provide a new and improved tip up light bar assembly having a flexible user-selectable configuration which can also function as a horizontal light bar.

These and other objects of the present invention are achieved by pivotally supporting front and rear light bars above transversely opposed end assemblies joined by connector bars to form a rigid support structure. Each light bar is built on a rigid substrate having a uniform cross section. Longitudinally extending features of the rigid substrate provide locations for mounting light sources, electronic assemblies and various lenses. The lenses, together with gaskets, define a weather-resistant enclosure surrounding the light sources and electronic assemblies.

The light bars pivot at transversely opposed ends to a vertical position in which the light sources are elevated above traffic. End assemblies pivotally support the hinge end of each light bar and provide a bumper for supporting the light bar free end in the horizontal position. Each end assembly includes a base plate, a pivotally mounted pivot plate, gas spring and limit strap. The gas spring reduces the dead weight of the light bar while the limit strap controls angular movement of the light bar relative to the base plate to approximately 90°. A motor-driven actuator exerts outward force on the pivot plates to move the light bars between a horizontal and a vertical position.

The tip up light bar assembly may supplement or replace standard fixed horizontal light bars on service vehicles. An optional traffic advisor including directional indicators may be fixed to the rear of the tip up light bar assembly.

DETAILED DESCRIPTION OF THE PREFERRED EMBODIMENT

Figure 1:
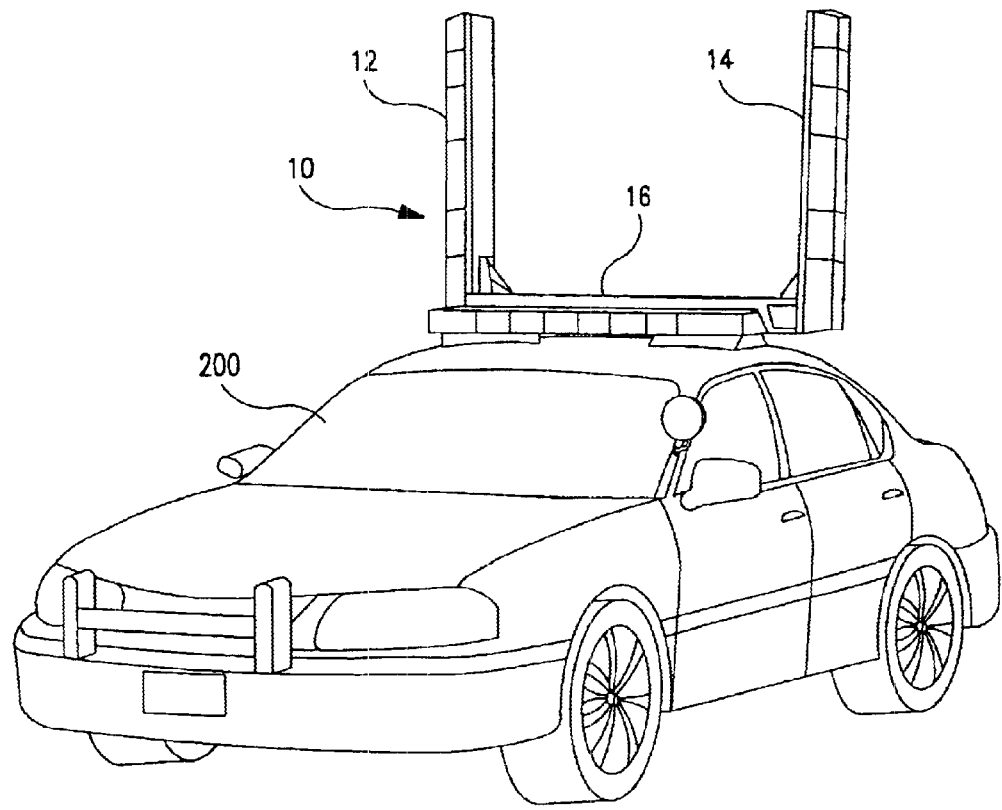
FIG. 1 is an oblique front view of a tip up light bar assembly in accordance with the present invention mounted to an emergency vehicle and shown in the elevated position.
Figure 2:
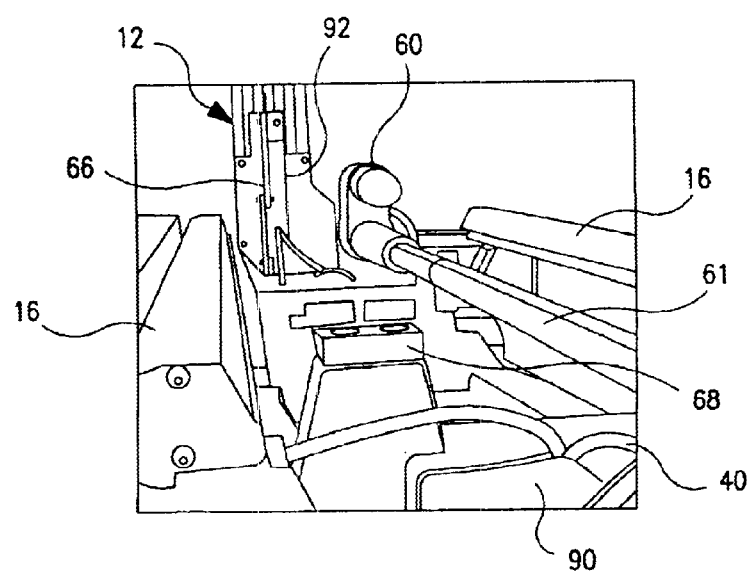
FIG. 2 is a detailed view of an end assembly mounting framework and motor driven actuator for the tip up light bar of FIG. 1.
Figure 3:
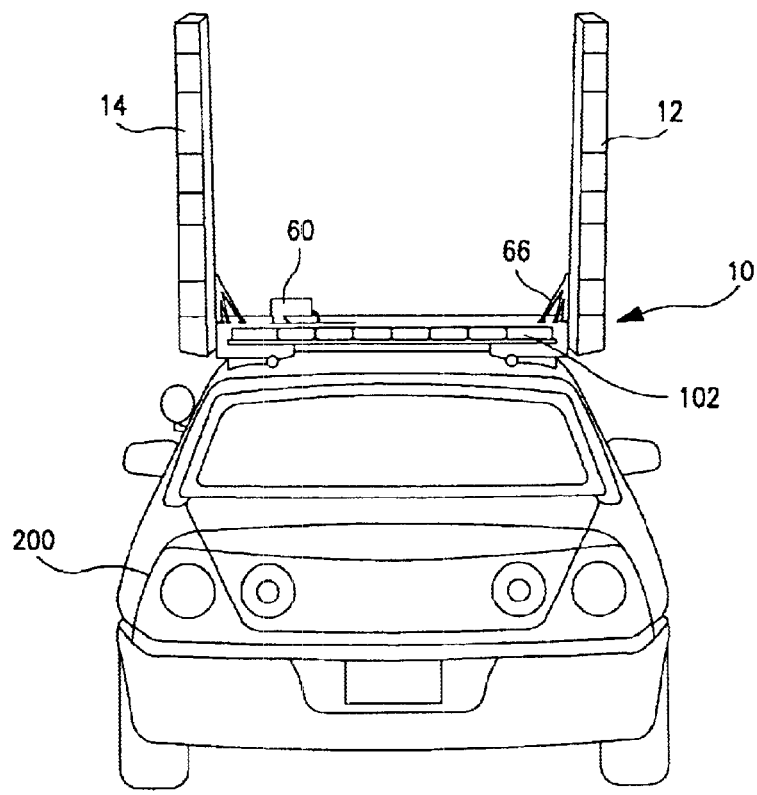
FIG. 3 is a rear view of the tip up light bar assembly of FIG. 1 including an optional rear facing traffic advisory.

With reference to FIGS. 1–9 wherein like reference numbers refer to like parts throughout the Figures, a tip up light bar assembly in accordance with the present invention includes front and rear light bars which are movable through an arc of 90 between a horizontal position (illustrated in FIG. 4) and a vertical position (illustrated in FIGS. 1 and 3). In accordance with the present invention, front and rear light bars 12, 14 are secured to opposed end assemblies 18 which are in turn connected by front and rear connecting bars 16. In a horizontal, or resting position, the light bars 12, 14 extend across the width of the vehicle 200 to present an elongated warning light array to approaching vehicles and pedestrians. When discussing the tip up light bar assembly 10 in this specification, the terminology "length" and "longitudinal" will refer to that dimension of the tip up light bar assembly extending across the width of a vehicle. The lateral dimension of the tip up light bar assembly is that dimension directionally corresponding with the length of a vehicle 200.

With reference to FIGS. 5 and 7–9, each light bar 12, 14 includes a plurality of light sources 50, 52, 54 mounted to a rigid substrate 30 and enclosed within a multi-part lens assembly 70. The lens assembly components include light transmissive end domes 72.and light transmissive sections 76 as well as opaque sections 74. Each lens element 72, 74, 76 includes a lower lip 73 configured to compress a gasket cord 78 into a channel 36 defined by the rigid substrate 30. Divider gaskets 80 and divider segments 82 separate each lens element 72, 74, 76. The divider gaskets 80 each include a groove 81 configured to mate with the end of a lens element 72, 74, 76 on one side. A channel 83 in the divider segment 82 receives the divider gasket such that when the lens elements, divider gaskets and divider segments are assembled to the rigid substrate 30, each divider gasket 80 is held in compressed relationship between a lens element and a divider segment 82. Each divider segment 82 includes a downward projection 85 configured to engage the gasket cord channel 36 defined by the rigid substrate 30. Together, the gaskets, lens elements and divider segments form a substantially weather tight lens assembly 70 enclosure surrounding the plurality of light sources and any electronic assemblies mounted to the rigid substrate 30.

Each rigid substrate 30 in the illustrated preferred embodiment comprises an extrusion of aluminum alloy. Other materials and methods of manufacture are possible. However, extruding is a particularly efficient method of manufacturing the complex, but uniform cross sectional shape of the rigid substrate 30. A plurality of channels, each defining a longitudinally extending opening, extend the length of the rigid substrate 30. Two downwardly facing channels 20 are configured to receive the enlarged head of mounting fasteners 24 which will be used to secure the rigid substrate 30 to a pivot plate as will be discussed below. A gasket channel 36 is defined along the upper outer longitudinal edges of the rigid substrate 30 for receiving the gasket cord 78. End pieces 26 mount to opposed ends of the rigid substrate 30 to provide a finished appearance for the lateral ends of the light bar. The end pieces 26 extend the gasket channel 36 around the lateral ends so that the gasket channel circumscribes the periphery of the rigid substrate 30. Fastening hardware passes through the end pieces and into an extruded fastener receptacle 25 in the rigid substrate.

The rigid substrate 30 also defines a plurality of rectangular C-shaped mounting channels 22, two of which face upwardly, and two of which face outwardly along the front and rear longitudinal edges of the rigid substrate. These C-shaped rectangular channels 22 receive plastic screw anchors 28 that expand within the channel 22 when penetrated by an appropriate fastener 29. Each expanded screw anchor 28 is securely fixed relative to the rigid substrate 30 by the compressed relationship within the C-shaped mounting channel 22. The channel/screw anchor/fastener arrangement provides a flexible means for securing all of the various components, i.e., light sources, electronic assemblies, and lens elements at selected positions along the rigid substrate 30.

It will be understood by those of skill in the art that the above-described rigid substrate, channel and plastic screw anchor assemblies provide for flexibility in configuring the light bar. Brackets 44 secured to the rigid substrate support pairs of front and rear facing light sources. The light sources and lens components 56 are in turn secured to the brackets by similar screw anchors 28 and fasteners 29. Each light bar may thus be custom configured to customer specifications. The rigid substrate is machined to provide an opening 32 through which electrical cabling 40 can pass to provide power and control signals to the light sources and electronic assemblies within the enclosure defined by the lens assembly 70. A grommet 34 protects the cable 40 from chafing.

Figure 5:
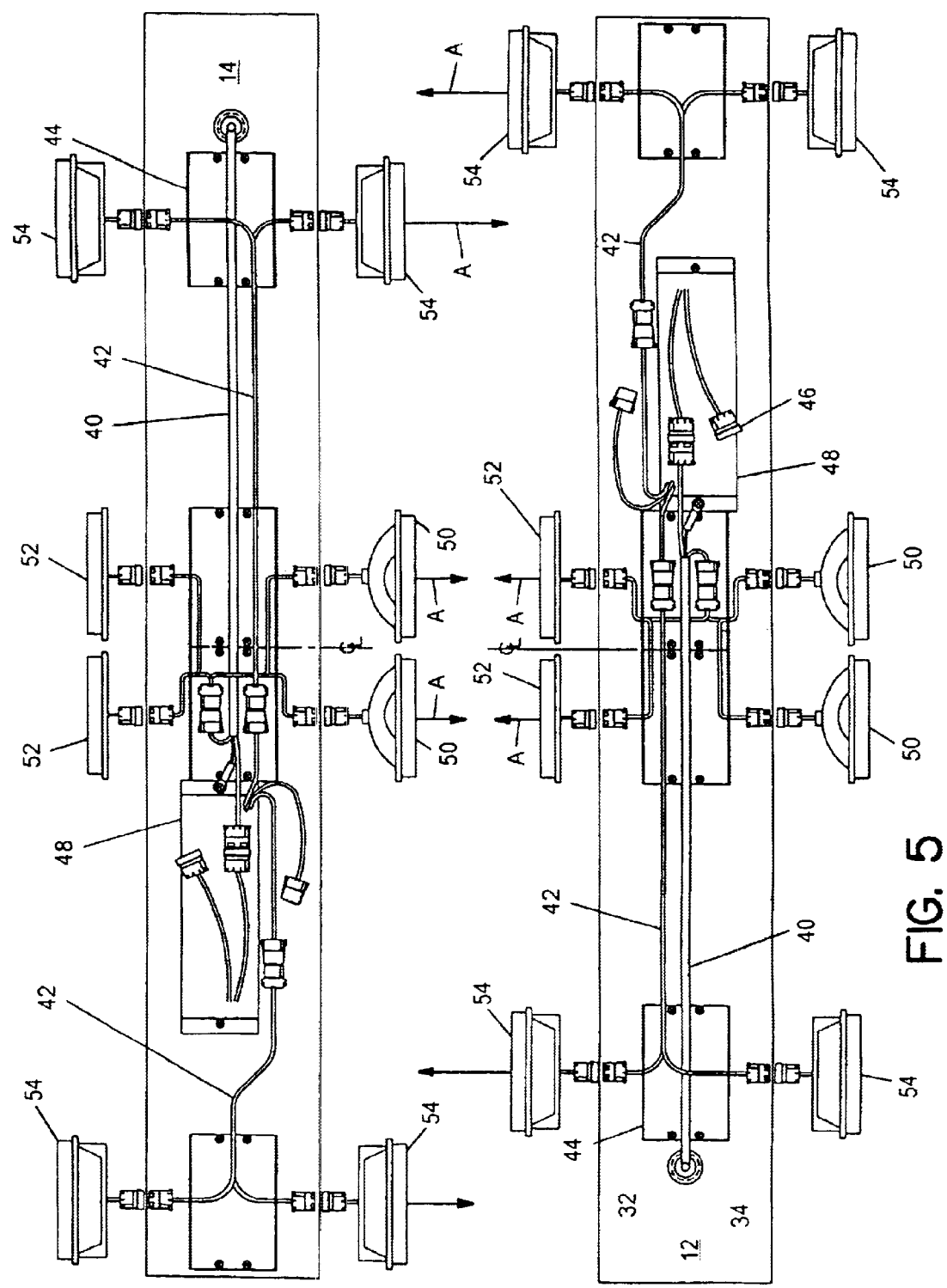
FIG. 5 is a top schematic illustration of the front and rear light bars of the tip up light bar assembly of FIG. 1.
Figure 7:
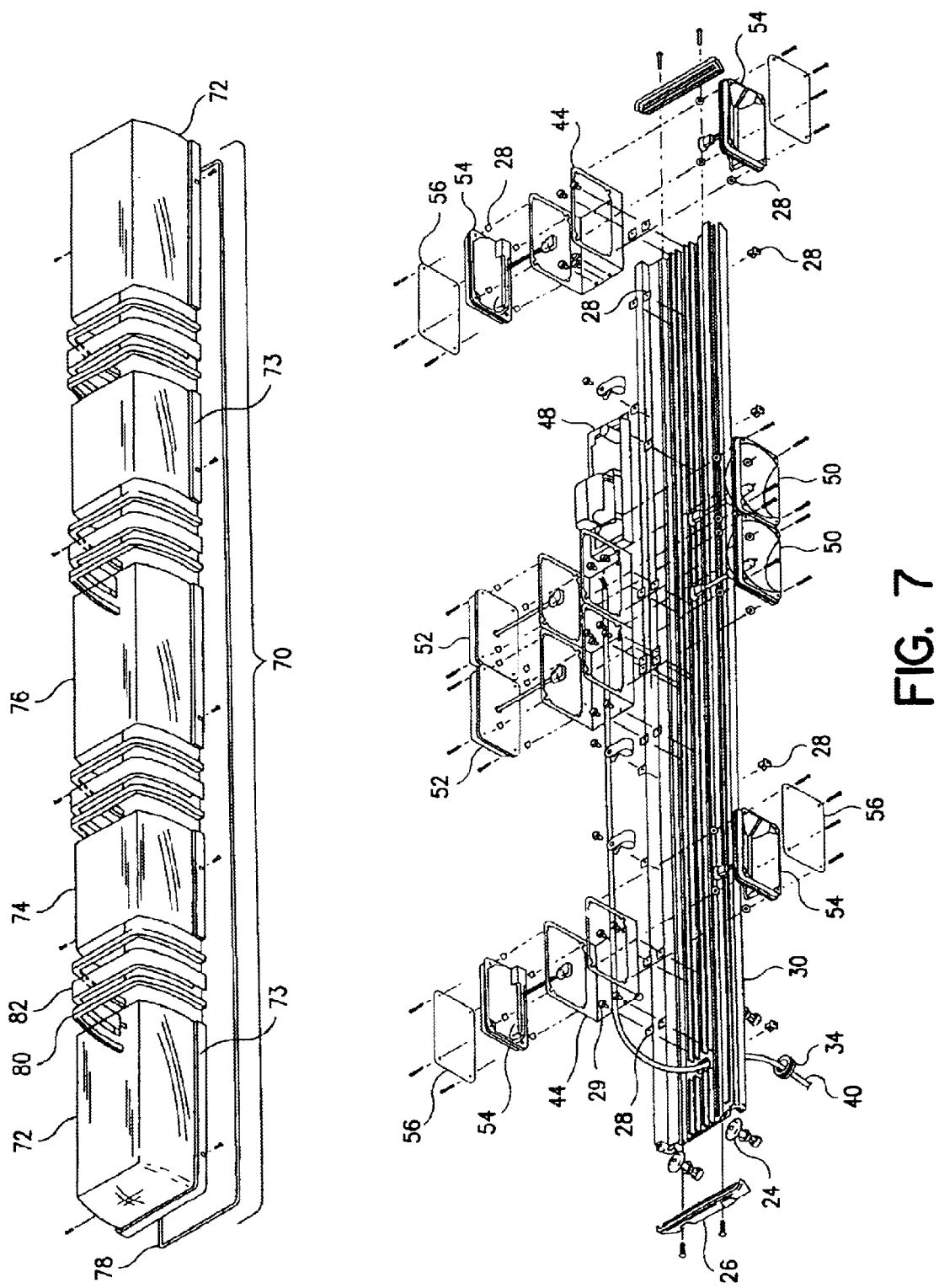
FIG. 7 is an exploded perspective view of the front light bar of the tip up light bar assembly illustrated in FIG. 1.
Figure 8:
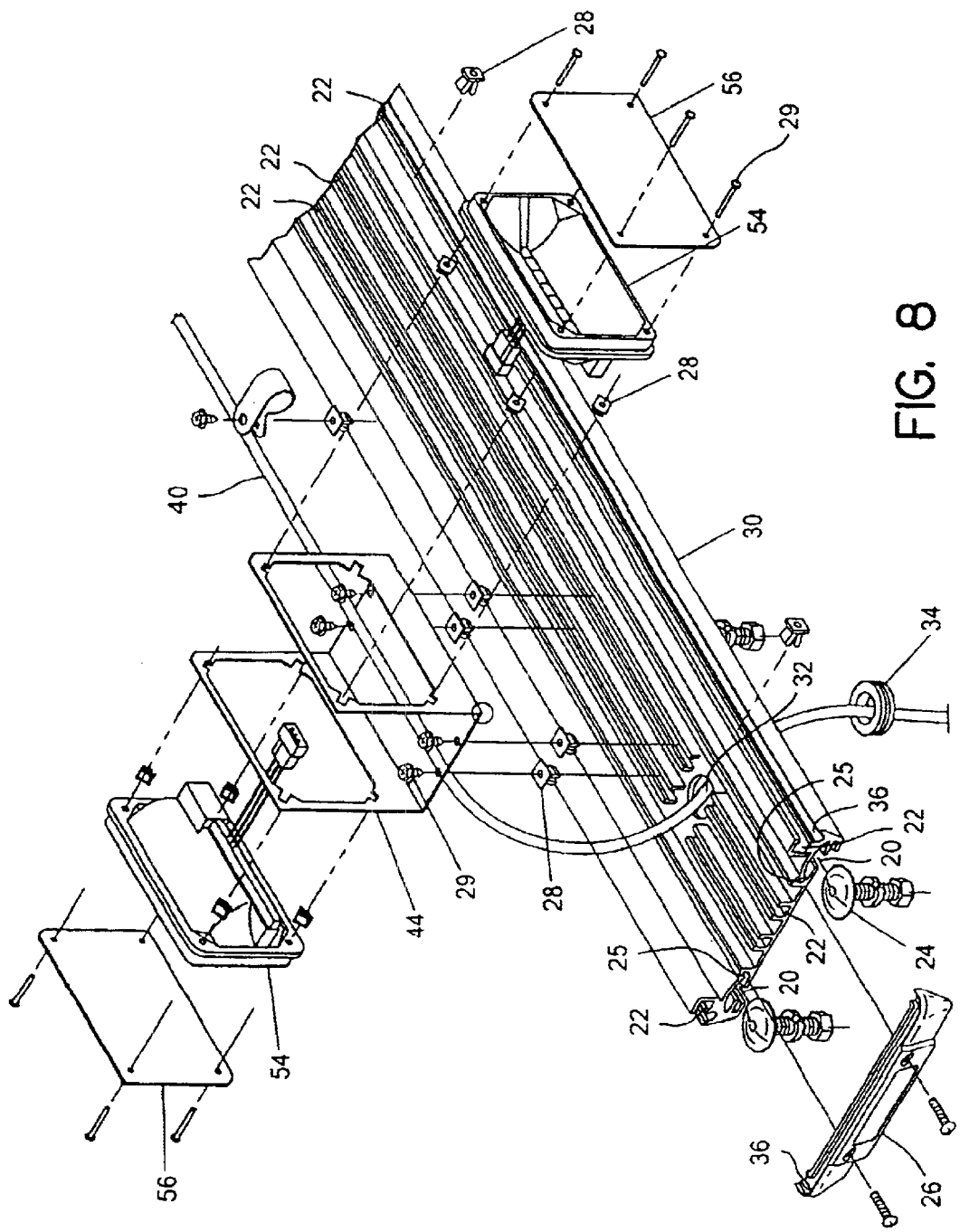
FIG. 8 is an enlarged detail view of the lower left end portion of the front light bar illustrated in FIG. 7.
Figure 9:
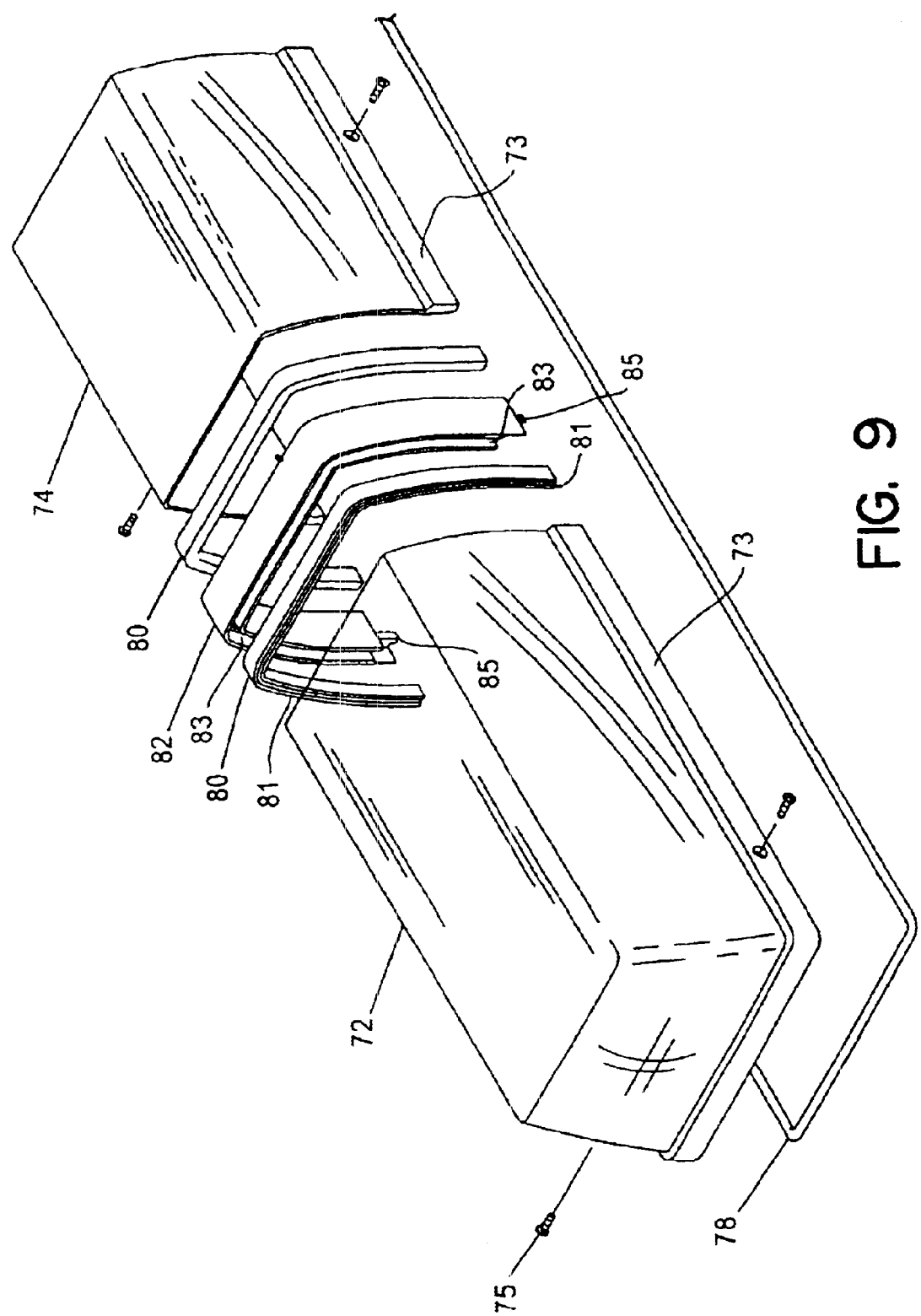
FIG. 9 is an enlarged detail view of the upper left end portion of the front light bar illustrated in FIG. 7.

FIG. 5 is a schematic illustration showing the types and relative locations of the light sources for the illustrated preferred embodiment, which should be regarded as representative of numerous possible configurations. The front light bar 12 illustrated in FIGS. 7–9 is illustrated at the bottom of FIG. 5 while the rear light bar 14 is illustrated above. Each light bar 12, 14 includes light sources facing the front and rear of the vehicle. The illustrated preferred embodiment of the front light bar 12 includes two centrally located, forward-facing halogen lamps 50 and two centrally located, rearward-facing LED light sources 52. Front and rear-facing stroboscopic light sources 54 are located adjacent the right end and inwardly from the left end of the front light bar 12. Rear light bar 14 includes the same configuration of two central forward-facing halogen lamps 50 and two rearward facing LED light sources 52. The location of the four stroboscopic light sources 54 of the rear light bar 14 is a mirror image of the corresponding components of the front light bar 12.

Electrical cabling 40 enters each light bar through opening 32 to carry electrical power and/or control signals into the enclosure defined by the lens assembly 70. Internal wire harnesses 42 distribute power within the light bar. Generally, vehicle power is delivered to a power supply 48 and then distributed by internal wire harnesses 42 and connectors 46 to the stroboscopic light sources 54. Power for the LED and halogen light sources 52, 50 does not pass through the power supply, but is provided directly from a switched power supply mounted inside the vehicle 200. It will be understood that the location and types of light sources will typically be dictated by customer specification and are entirely flexible in accordance with the present invention.

Figure 4:
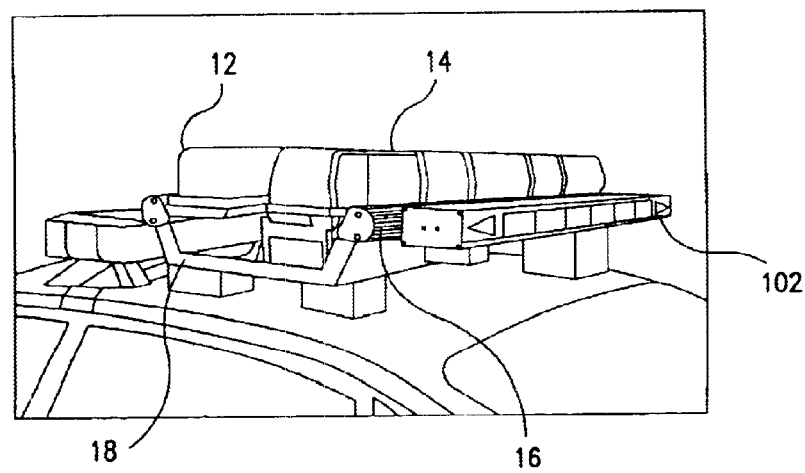
FIG. 4 is an oblique side view of the tip up light bar assembly of FIGS. 1 and 3 shown in the horizontal position.
Figure 6:
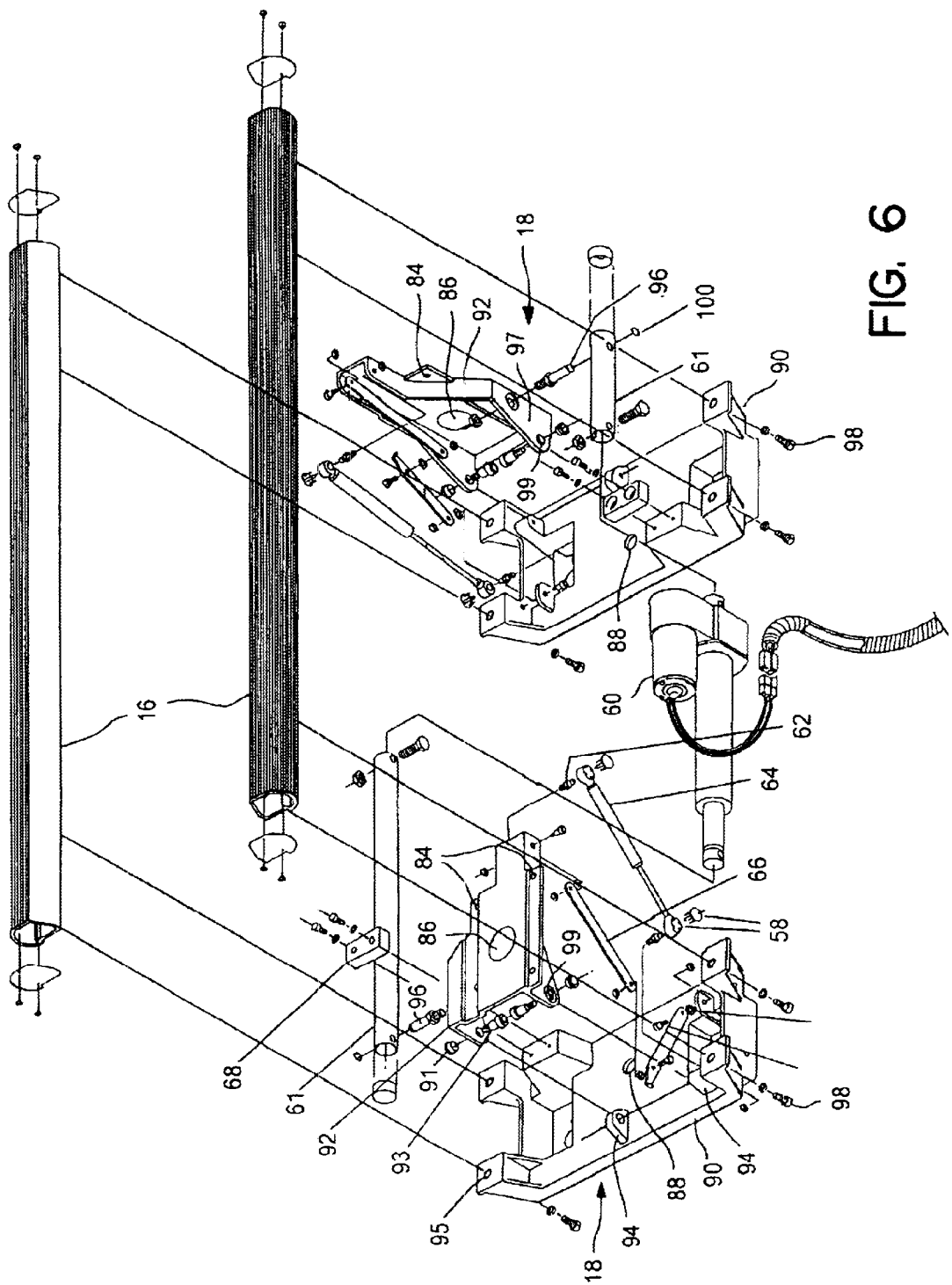
FIG. 6 is an exploded perspective view of the end assemblies, framework and motor driven actuator for the tip up light bar assembly of FIG. 1.

The front and rear light bars are pivotally supported above an emergency vehicle 200 by laterally opposed end assemblies 18 connected by front and rear connecting bars 16. With reference to FIGS. 2, 4 and 6, each end assembly includes a base plate 90, pivot plate 92, gas spring 64, folding limit strap 66, and associated hardware. In the illustrated preferred embodiment, base plate 90 and pivot plate 92 are castings of aluminum alloy, although other materials and methods of construction are of course possible. The end assemblies 18 are essentially the same and are rotated 180 to support the laterally opposed ends of the front and rear light bars 12, 14. Each base plate 90 includes four mounting points 95 for securing the front and rear connector bars 16. The mounting points 95 are defined by elevated, reinforced brackets such that the base plate 90 has a cradle-shaped configuration. In the illustrated embodiment, the front and rear connector bars 16 are extrusions of aluminum alloy and are identical. When secured to the base plates 90 by fasteners 98, the connector bars 16 maintain the base plates in alignment and provide a rigid framework for supporting the pivotally mounted light bars 12, 14.

Each base plate 90 defines a pivot point for a pivot plate 92. The pivot point comprises laterally spaced flanges 94 defining openings through which shouldered fasteners 93 pass to engage plain bearings 91 secured in complementary openings in the pivot plate 92. The lateral spacing of the pivot flanges 94 enhances the structural rigidity of the pivoting assembly. Webs 97 and ribs reinforce the structural integrity of the pivot plate 92. The base plate 90 and pivot plate 92 also define locations for mounting opposed ends of a gas spring 64 and limit strap 66. The gas spring 64 is connected between the base plate 90 and the pivot plate 92 to reduce the dead weight of each light bar and thus assist in raising the light bar from its horizontal position to a vertical or warning position. Ball end studs 62 secured to the base plate and pivot plate are received in end fittings 58 on the gas spring 64. A two piece folding limit strap 66, secured to both the base plate and the pivot plate, limits upward angular movement of the pivot plate 92 relative to the base plate 90. The limit strap 66 is folded when the pivot plate 92 is in a horizontal position and extends to a maximum length when the pivot plate is substantially perpendicular to the mounting plate 90.

Each pivot plate 92 presents a large support surface to which a first or hinge end of each light bar 12, 14 is mounted. The illustrated pivot plates include four openings 84 through which the large headed fasteners 24 pass to secure the rigid substrate 30 to each pivot plate 92. Each pivot plate 92 further defines an opening 86 through which cabling can pass into the light bar 12, 14. Each base plate 90 defines a corresponding cabling opening 88 and a raised location to which is mounted a bumper 68 to support the second end of each light bar 12, 14 when the light bars are in the horizontal position. Each pivot plate further defines a location for securing an actuator-mounting stud 96. A motor driven actuator 60 is connected between the pivot plate-mounted actuator-mounting studs 96 by rigid actuator tubes 61. The actuator tubes 61 are secured over the actuator studs by snap rings 100. The motor driven actuator 60 applies equal outward force to both actuator-mounting studs, causing the front and rear bars 12, 14 to rise from their horizontal position to the vertical warning position. The actuator mounting stud locations are spaced apart from the pivot plate pivot point 99 to provide mechanical leverage on the light bars 12,14. The gas springs 64 include damping means for smoothing the raising and lowering of the light bars. One end of the motor driven actuator 60 is fixed relative to an actuator mounting stud 96 by a short actuator tube 61, while the other end of the motor driven actuator comprises a ram from which a long actuator tube 61 extends to connect to the opposed actuator mounting stud 96.

When in the lowered or rest position illustrated in FIG. 4, the tip up light bar assembly 10 may serve as a fully functional emergency vehicle warning light bar. Each light source 50, 52, 54 includes a reflector and/or lens which defines a direction of light transmission A for the light source (see FIG. 5). As can be seen from FIGS. 4 and 5, in the lowered or rest position, the direction of light transmission A for the rear-facing LED light sources 52 of the front light bar 12 must pass through the forward-facing halogen light sources 50. Thus, when viewed from the front, light emitted by the forward-facing halogen light sources 50 of the rear light bar 14 is substantially blocked by light sources 52, 50 mounted to the center of the front light bar 12. In accordance with a significant aspect of the invention, some of the light sources are arranged in a staggered configuration to permit the rear-facing front light bar strobes 54 to be visible through light transmissive elements of the rear light bar 14. Correspondingly, the front-facing rear light bar strobes 54 are visible through light transmissive elements of the front light bar 12. The mirror image front and rear light bars present a symmetrical lighting configuration when raised to the vertical or warning position.

FIGS. 3 and 4 illustrate an optional traffic advisory 102 which may be mounted to the rear connector bar. The traffic advisory 102 includes a plurality of yellow caution light sources and laterally spaced directional indicators. The optional traffic advisory 102 permits emergency personnel to direct oncoming traffic toward the left or right of the emergency vehicle so equipped.

It will be noted that the illustrated tip up light bar assembly 10 is mounted in an elevated position relative to the roof of an emergency vehicle. This permits continued use of the conventional light bar already fixed to the emergency vehicle 200 (see FIGS. 1–4). Alternatively, the conventional light bar may be omitted with the tip up light bar assembly 10 mounted more closely to the roof of the emergency vehicle 200.

While a preferred embodiment of the foregoing invention has been set forth for purposes of illustration, the foregoing description should not be deemed a limitation of the invention herein. Accordingly, various modifications, adaptations, and alternatives may occur to one skilled in the art without departing from the spirit and the scope of the present invention.

What is claimed is:

1. A tip up integrated light bar assembly comprising:

frame means mountable to the top of a vehicle for connecting transversely opposite end assemblies;

a first integrated light bar comprising a first elongated array of warning lights mounted to a first rigid substrate having first and second ends and covered by a plurality of lens elements, said lens elements together at least partially defining a water resistant enclosure surrounding said array of warning lights, said first integrated light bar hingedly mounted to one of said end assemblies adjacent said first end and movable between a horizontal position and a vertical position wherein said second end is displaced over an arc of approximately 90° relative to said horizontal position;

a second integrated light bar comprising a second elongated array of warning lights mounted to a second rigid substrate having first and second ends and covered by a plurality of lens elements, said lens elements together at least partially defining a water resistant enclosure surrounding said array of warning lights, said second integrated light bar hingedly mounted to the other of said end assemblies adjacent said first end and movable between a horizontal position and a vertical position wherein said second end is displaced over an arc of approximately 90° relative to said horizontal position; and motor-driven actuator means for displacing said first and second light bars between said horizontal and said vertical positions;

wherein each of said end assemblies comprises a base that defines a pivot point for the first end of one of said first or second rigid substrates, said base including a bumper spaced apart from said pivot point, said bumper supporting the second end of the other of said first or second rigid substrates when in said horizontal position.

2. The tip up integrated light bar assembly of claim 1, wherein said first and second rigid substrates comprise extrusions of aluminum alloy that define a plurality of longitudinally extending channels, each said channel including a longitudinally extending opening.

3. The tip up integrated light bar assembly of claim 1, wherein said frame means comprises:

connecting bars rigidly connecting one said end assembly to the other of said end assemblies.

4. The tip up integrated light bar assembly of claim 1, wherein each of said end assemblies comprises:

a pivot plate hingedly mounted to said pivot point, said pivot plate defining holes through which fasteners extend to fasten the first end of said first and second rigid substrates to said pivot plate and comprising an actuator mounting point to which said motor driven actuator is mounted.

5. The tip up integrated light bar assembly of claim 1, wherein each of said first and second integrated light bars include at least one power supply fixed to said rigid substrate within said water resistant enclosure.

6. The tip up integrated light bar assembly of claim 1, wherein said plurality of lens elements includes light transmissive lens elements and opaque lens elements.

7. The tip up integrated light bar assembly of claim 4, wherein each of said end assemblies comprises:

a gas spring pivotally mounted to said base and said pivot plate to exert an upward force on said pivot plate.

8. The tip up integrated light bar assembly of claim 4, wherein each of said end assemblies comprises:

a strap fixed between the base and the pivot plate to define a limit of arcuate movement of said pivot plate.

9. A dual light bar assembly comprising:

two longitudinally spaced base plates, each base plate comprising laterally spaced upwardly extending brackets and a bumper;

two laterally spaced connector bars, each connector bar connecting at least one base plate bracket with at least one bracket from the other base plate, wherein the base plate, connector bars and brackets define a cradle; and two light bars, each pivotally mounted to a base plate by a pivot assembly, wherein each said bumper defines a support for a non-pivot end of one said light bar, said pivot assemblies are received in said cradle, said light bars project generally above said cradle and said cradle defines a support structure for said pivotally mounted light bars.

10. The dual light bar assembly of claim 9, wherein said connector bars comprise extrusions of aluminum alloy.

11. The dual light bar assembly of claim 9, wherein said connector bars have a length and an exterior surface facing away from said pivotally mounted light bars and said exterior surface comprises a substantially uniform convex radius extending the length of said connector bar.

12. The dual light bar assembly of claim 9, wherein each said light bar comprises:

a rigid substrate;

a plurality of light sources mounted to said rigid substrate; and a plurality of lens elements mounted to said rigid substrate to define a weather resistant enclosure surrounding said plurality of light sources.

13. The dual light bar assembly of claim 9, wherein said light bars are moveable between a resting position in which said light bars are parallel to said connector bars and a raised position in which said light bars are substantially perpendicular to said connector bars.

14. The dual light bar assembly of claim 9, wherein said pivot assemblies are mounted at generally opposite positions of said cradle.

15. The dual light bar assembly of claim 9, wherein each said base plate is generally rectangular and one said bracket projects from each of the four corners of the base plate.

* * * * *